United States Patent
Hamre (10) Patent No.: US 9,816,332 B2
(45) Date of Patent: Nov. 14, 2017

(54) METHOD OF HARDBANDING A TUBULAR COMPONENT AND A TUBULAR COMPONENT HARDBANDED IN ACCORDANCE WITH THE METHOD

(71) Applicant: Apollo Machine & Welding Ltd., Leduc (CA)

(72) Inventor: Douglas J Hamre, Edmonton (CA)

(73) Assignee: Apollo Machine & Welding Ltd., Leduc, Alberta (CA)

( * ) Notice: Subject to any disclaimer, the term of this patent is extended or adjusted under 35 U.S.C. 154(b) by 208 days.

(21) Appl. No.: 14/555,786

(22) Filed: Nov. 28, 2014

(65) Prior Publication Data
US 2015/0306703 A1 Oct. 29, 2015

(30) Foreign Application Priority Data
Apr. 29, 2014 (CA) ..................... 2850201

(51) Int. Cl.
*F16L 57/00* (2006.01)
*E21B 17/10* (2006.01)

(52) U.S. Cl.
CPC .......... *E21B 17/1085* (2013.01); *F16L 57/00* (2013.01)

(58) Field of Classification Search
CPC .......................... E21B 17/042; E21B 17/1085
USPC ....... 138/173, 121, 122; 106/286.3; 166/380
See application file for complete search history.

(56) References Cited

U.S. PATENT DOCUMENTS

| 3,454,051 A * | 7/1969 | Goepfert ................... F16L 1/24 |
| | | 114/243 |
| 5,040,622 A * | 8/1991 | Winship .................. E21B 17/22 |
| | | 175/323 |
| 5,145,506 A * | 9/1992 | Goldstein ........... C22C 32/0052 |
| | | 419/17 |
| 8,602,113 B2 | 12/2013 | Jin et al. |
| 2012/0193148 A1* | 8/2012 | Overstreet ................ C23C 4/06 |
| | | 175/320 |
| 2015/0060050 A1* | 3/2015 | Scott ......................... C23C 4/08 |
| | | 166/241.1 |

* cited by examiner

*Primary Examiner* — Patrick F Brinson
(74) *Attorney, Agent, or Firm* — Davis & Bujold PLLC; Michael J. Bujold (57) ABSTRACT

A method of hardbanding a tubular component. The method involves placing a helical band of hardbanding material forming spaced coils around an exterior wear surface of a body of the tubular component. The helical band has a helix angle of not less than 5 degrees relative to a longitudinal axis of the tubular component and the spacing between the coils is a minimum of 18 mm.

6 Claims, 13 Drawing Sheets

FIG. 1

Prior Art

FIG. 2

Prior Art

Prior Art

Prior Art

FIG. 8

Prior Art

FIG. 9

Prior Art

FIG. 10

Prior Art

FIG. 13

METHOD OF HARDBANDING A TUBULAR COMPONENT AND A TUBULAR COMPONENT HARDBANDED IN ACCORDANCE WITH THE METHOD

FIELD

There is described a method of hardbanding a tubular component and a tubular component hardbanded in accordance with the teachings of the method. This method was developed for reducing wear and erosion of drill string components.

BACKGROUND

Figure 1:
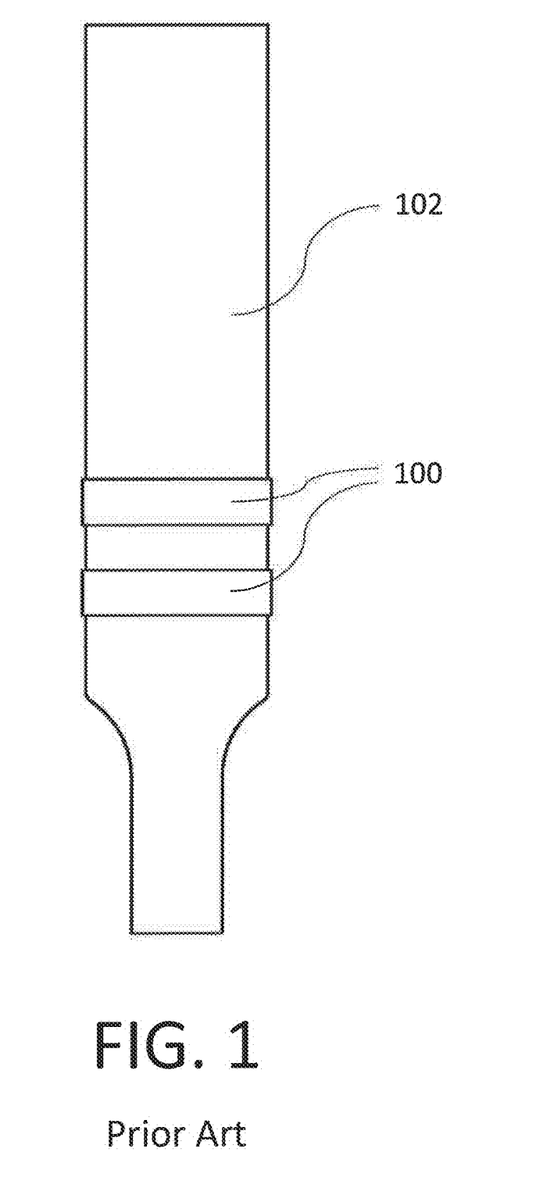
FIG. 1 is a schematic view of a prior art conventional hardband.

The drilling process creates cuttings at the bit, which must be carried to the surface for drilling to continue efficiently. Conventional methods of hardbanding place a strip of wear resistant material around the entire circumference of a component to protect the major diameter from wear due to contact of the component with the formation, casing or other components. By design, the diameter of a conventional hardband is larger than the component it is placed on. A conventional hardband is applied around the circumference of a tubular component, along the horizontal axis of the component, which is perpendicular to the longitudinal axis of the component (FIG. 1). The increased diameter of the band around the entire circumference of the component protects that component from wear by contact with the formation or casing, however it can become an obstacle for cuttings produced during drilling as they make their way to the surface, carried by drilling fluid.

The presence of an obstacle to cuttings is of particular importance during directional drilling when the drill string can be pulled to the bottom side of the hole by gravity. In the circumstance when the string, a section of the string, or a particular component of the string is pulled to one side of the hole, cuttings can become trapped on the leading edge of a conventional hardband. A narrower than normal gap on one side of the hole will result in a wider gap on the opposite side of the drilling string given a constant hole size. A wider gap would result in preferential mud flow on the wider side, and therefore less effective cuttings removal from the narrow side. The combined effects of less effective mud flow and the obstacle to cuttings passing due to the geometry of the hardband can result in a significantly increased residence time of cuttings in a specific area of the drill string. The specific area is most commonly an area of steel on the downhole side of a hardband, which has minimal resistance to wear and erosion. In certain formations, particularly those with a high sand content, it is possible to have similar wear on the uphole side of a hardband as significant drilling time can be spent back reaming the hole due the presence of loose sand. The erosion of the unprotected steel is compounded by the rotation of the drill string with cuttings trapped or piled up in a specific location.

The effects of wear and erosion caused by cuttings can damage expensive machined components, and damage hardbands by removal of material adjacent to, or underneath the hardband. Removal of substrate steel adjacent to, or underneath a hardband (FIG. 2) results in additional costs to repair the wear surface that protects the major diameter of the component of the drill string it is placed on. In addition, the undermining of the hardband reduces the potential useful life of the component compared with a situation where damage due to wear induced by a relatively high residence time of cuttings in a particular location does not occur.

Figure 3:
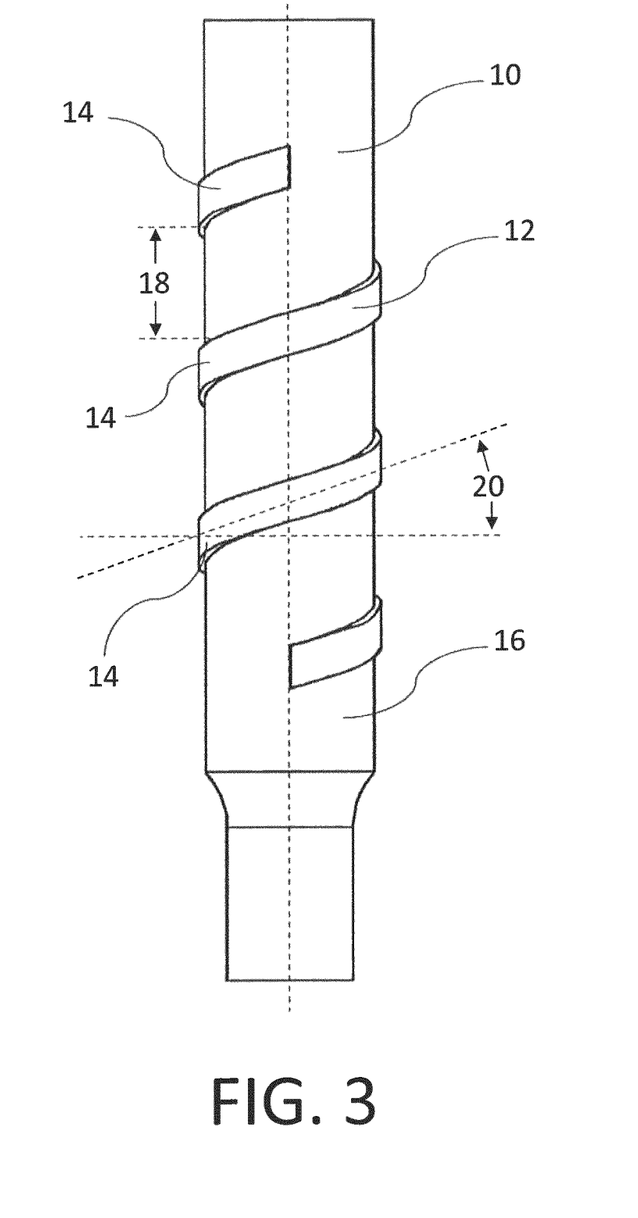
FIG. 3 is a side elevation view of a tubular component with helical hardbanding according to the method.

Exxon Mobile holds U.S. Pat. No. 8,602,113 which is titled "Coated Oil and Gas Well Production Devices". The associated text states that "[t]he patterned hardbanding design will enable the sand grains to preferentially take an alternate path through the non-contact areas due to the hydrodynamic forces, and avoid a direct path through the maximum pressure of contact". The text also references the types of patterns shown in the prior art as depicted in FIG. 3 stating that these shapes "can be applied directly or machined in the hardbanding after bulk application" and continues to provide a more specific example where "a non-limiting exemplary design considering this is a single bead spiral made by laser welding techniques". The single bead laser welded spiral is described as one "wherein the angle is small in reference to the horizontal axis of the hardbanding section, and the grooves or regions between hardbanding material are 1 mm-5 mm deep and 1 mm-5 mm wide".

SUMMARY

According to an aspect, there is provided a method of hardbanding a tubular component. The method involves placing a helical band of hardbanding material forming spaced coils around an exterior wear surface of a body of the tubular component. The helical band has a helix angle of 5 degrees or more, the coils having a spacing of 18 mm or more between adjacent coils.

According to another aspect, the hard band may have a width of 15 mm or more.

According to another aspect, the helical band may comprise between 1 and 3 continuous coils around the exterior wear surface.

According to another aspect, multiple helical bands with offset start points may be intertwined to form a double helix.

According to another aspect, the helical band may be applied by a laser.

According to another aspect, the hardbanding material may be a non-magnetic Ni-based matrix with 40-80 wt. % of spherical fused tungsten carbide or macrocrystalline (angular) tungsten carbide.

According to an aspect, there is provided a method of hardbanding a tubular component. The method involves using a laser to apply a helical band of hardbanding material of a non-magnetic Ni-based matrix containing 40-80 wt. % of spherical fused or macrocrystaline tungsten carbide forming spaced coils around an exterior wear surface of a body of the tubular component, the helical band having a helix angle of 5 degrees or more, the spacing between the coils being a minimum of 18 mm, and the hard band being a minimum of 15 mm wide.

According to another aspect, the helical band may pass between 1 and 3 times or 2 and 3 times around the tubular component.

According to an aspect there is provided a tubular component with a tubular body having an exterior wear surface and a horizontal axis. A helical band of hardbanding material forms spaced coils around the exterior wear surface of the body. The helical band has a helix angle of 5 degrees or more, the coils having a spacing of 18 mm or more between adjacent coils.

According to another aspect, the helical band may comprise between 1 and 3 or 2 and 3 continuous coils around the exterior wear surface.

According to another aspect, the hardbanding material may be a non-magnetic Ni-based matrix with 40-80 wt. % of spherical fused tungsten carbide or macrocrystalline (angular) tungsten carbide.

According to another aspect, the hard band may be a minimum of 15 mm wide.

According to an aspect, there is provided a tubular component with a tubular body having an exterior wear surface and a horizontal axis, a helical band of hardbanding material of a non-magnetic Ni-based matrix with 40-80 wt. % of spherical fused or macrocrystalline (angular) tungsten carbide forming spaced coils around the exterior wear surface of the body, the helical band being at an angle of not less than 5 degrees relative to the longitudinal axis of the body, the spacing between the coils being a minimum of 18 mm, and the hard band being a minimum of 15 mm wide.

According to another aspect, the helical band may pass between 1 and 3 times or 2 and 3 times around the tubular component.

When the hardbanding described above is applied to a tubular drill string component, the helical band acts as an auger and encourages abrasive particles in the drilling fluid to bypass the band without delay, thereby reducing wear and erosion of the drill string component.

The best method of applying the helical band is considered to be by a laser with CNC or robotic controls. The hardbanding material which has provided beneficial results is a non-magnetic Ni-based matrix with 40-80 wt. % of spherical fused tungsten carbide or macrocrystalline (angular) tungsten carbide.

Even more beneficial results may be obtained when the hard band has a minimum width of 15 mm. Having such a minimum width serves to protect a greater surface area of the component and protects component during extended use even if wear of the leading edge of the band does occur.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A method of hardbanding a tubular component will now be described with reference to FIG. 1 through 13.

Figure 2:
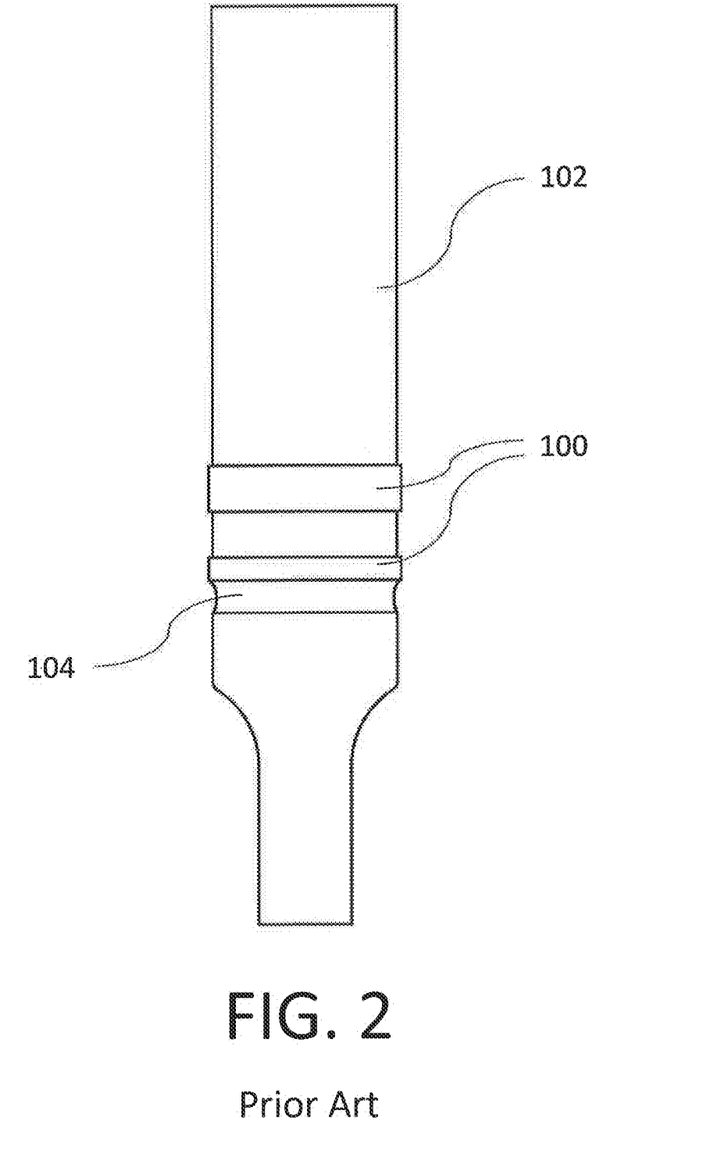
FIG. 2 shows the effects of damage caused by abrasive particles on a prior art conventional ring hardband.

Conventional ring hardbanding as shown in FIG. 1 is created by applying a continuous ring of hardbanding 100 to tubular component 102. In the depicted example, two rings of hardbanding 100 are used. This conventional ring hardbanding has been demonstrated to increase the useful life of tubular components, however they are subject to a life limiting characteristic of damage 104 adjacent to the hardband 100, as shown in FIG. 2.

Referring to FIG. 3, a tubular component 10 may be hardbanded by replacing a conventional ring hardband with a helical (spiral) hardband 12. Helical hardband 12 has coils 14 spaced around an exterior wear surface 16 of the tubular component 10. The spacing 18 between coils 14 is 18 mm or more between adjacent coils 14. The angle between the helix of the helical hardband 12 and a line perpendicular to the longitudinal axis of the tubular component 10 is the helix angle 20. The helix angle is 5 degrees or more. By applying this helical hardband 12, the damage adjacent to the hardbanding can be reduced or eliminated, further extending the life of the component.

Figure 4:
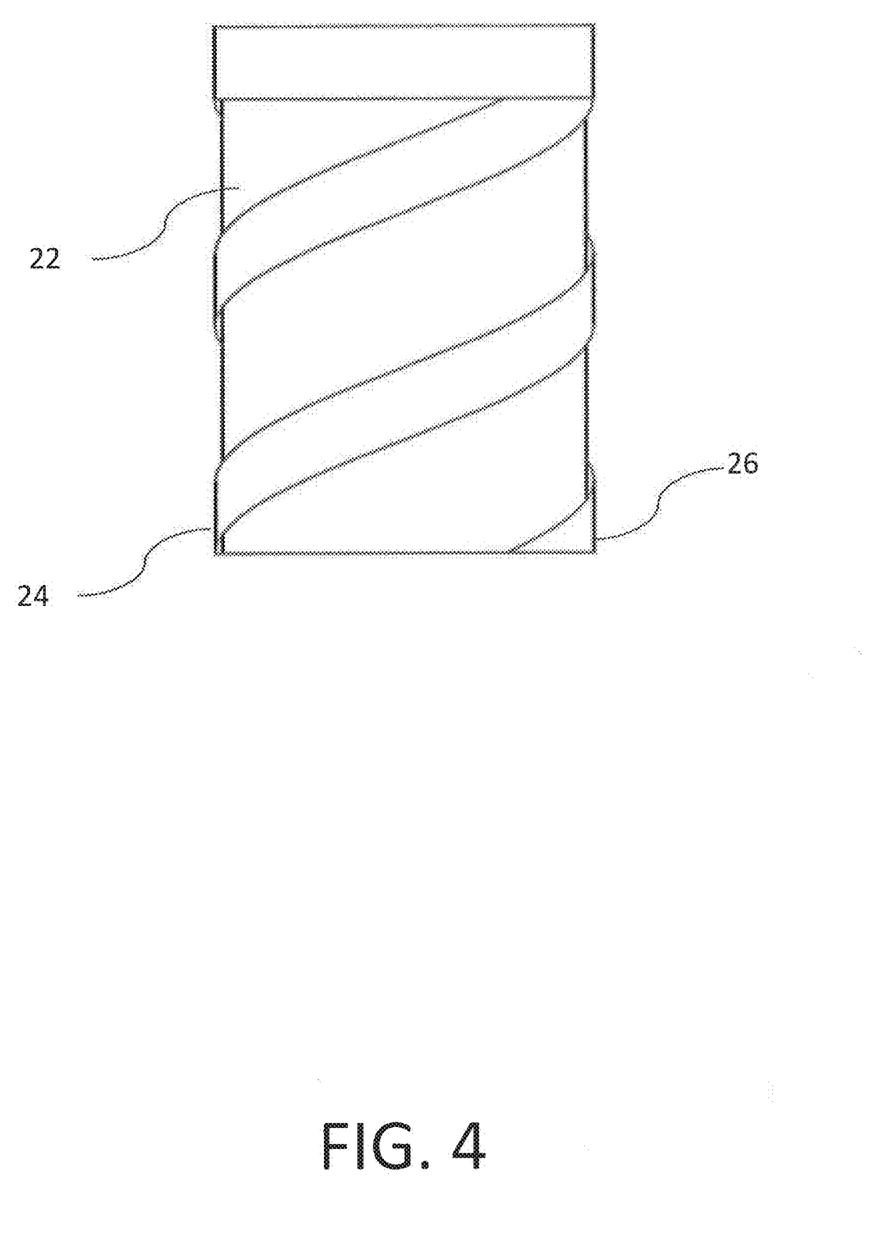
FIG. 4 shows two intertwined helical hardbands forming a double helix.

If the geometry or features of the tubular component 22 restrict the overall length of the helical hardband, it is beneficial to use the current design with respect to the helix angle 20 and the minimum width of 15 mm and start a second helical hardband 24 180 degrees around that tubular component 22 from the startpoint of the original helical hardband 26 to form a double helix design as shown in FIG. 4. The spacing of the current design allows two helical hardbands to be interlaced to form a double helix to provide maximum wear protection, while still providing for a minimum residence time of abrasive particles in the vicinity of the wear material.

Figure 13:
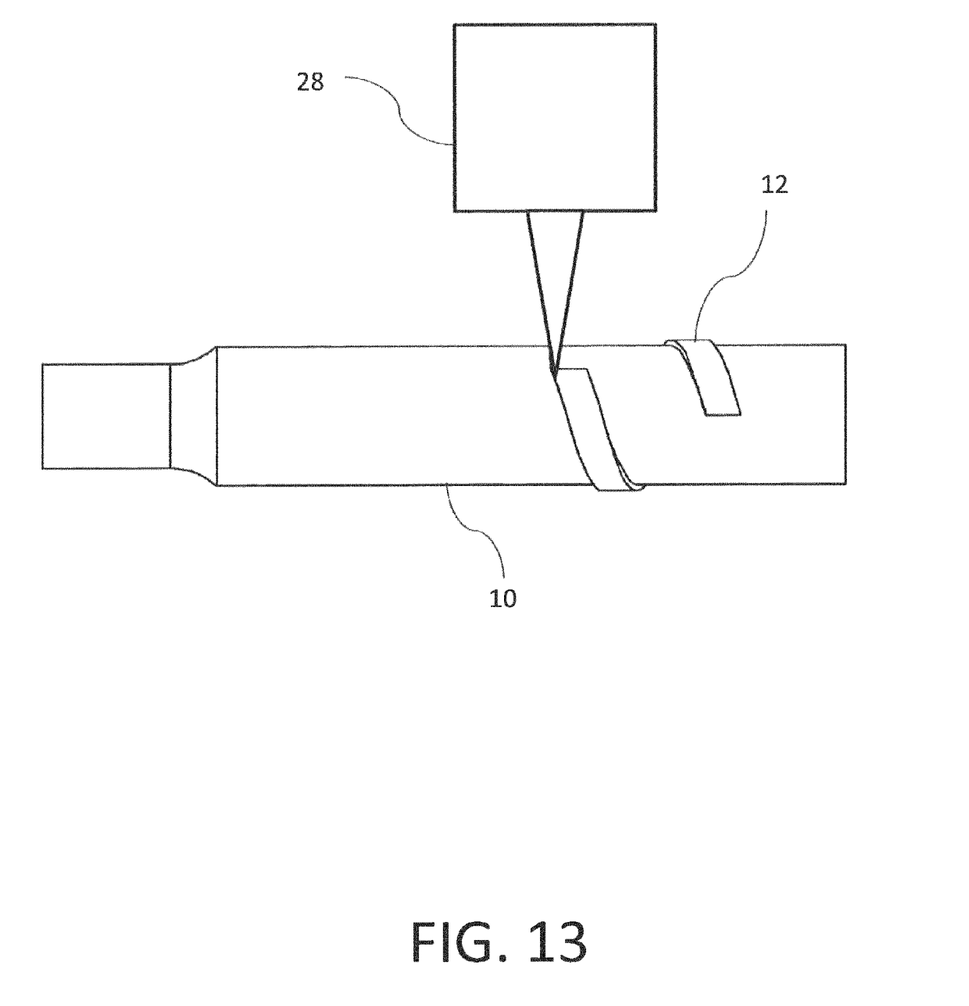
FIG. 13 is a helical hardbanding schematic showing a laser applying a hardband.

Referring to FIG. 13, laser application is the preferred method so as to provide a metallurgical bond with the substrate material (or previously deposited layer) while melting a minimum amount of that substrate material. Helical band 12 is applied by a laser 28.

The hardfacing material can be applied with or without the use of a Ni-based buffer layer to a variety of steels used for drilling string components and tools.

A non-magnetic, laser applied hardfacing comprised of a Ni-based matrix and 40-80 wt. % spherical fused tungsten carbide or macrocrystalline (angular) tungsten carbide.

The path of the laser is programmed using Robotic or Computer Numeric Control (CNC) methods to follow a precisely determined path.

A continuous path is programmed for efficiency so that the laser is continually depositing material onto the component with overlapping beads until the desired hardband width is achieved. A single bead is only considered effective if the laser equipment is capable of application of a sufficient width for that single bead (ie: greater than 15 mm).

The path is helical and wraps around the component using a predetermined geometry, taking into account the final width of the bead and the desired spacing for the particular application.

The path of the hardbanding is defined in a helical shape such that during normal operation of the drilling string, the rotation of the band would force cuttings past the hardband rapidly as the band would operate as an auger.

Conversely, for operations that require significant back remaining due to the composition of the formation, the spiral shape may be reversed to prevent erosion on the uphole side of the hardbanding.

By providing a specific path and method for cuttings to move past the hardband in concert with the normal operation of the drilling string, the residence time of cuttings near the leading edge of the hardband would be reduced.

The reduction of residence time of cuttings in a specific location of the drilling string reduces damage of drilling string components and increases the useful life of components and tools in the drilling string.

Figure 5:
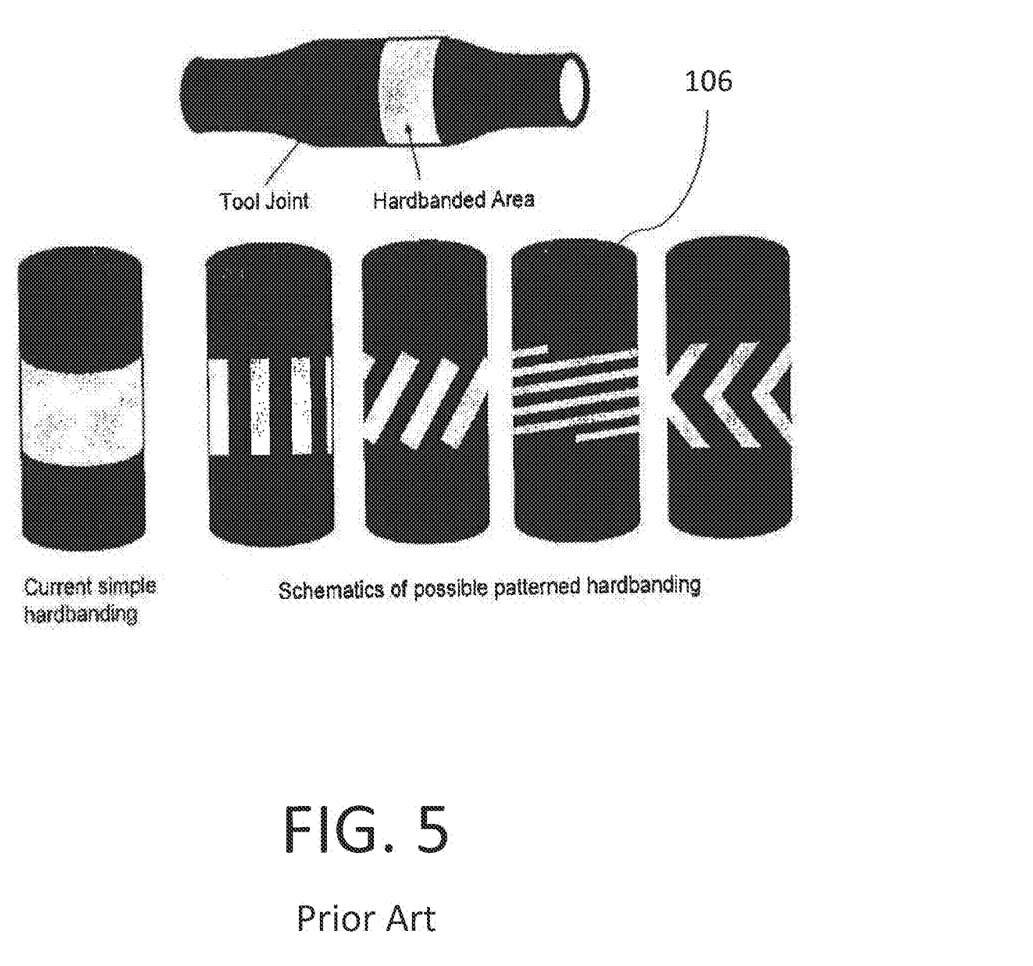
FIG. 5 includes side elevation views of a number of possible variations of tubular components with helical hardbanding found in the prior art.

Comparison with Prior Art:

Referring to FIG. 5, a spiral band 106 is shown as a "schematic of possible patterned hardbanding" along with multiple other potential alternatives to a simple conventional band. The prior art is described as one "wherein the angle is small in reference to the horizontal axis of the hardbanding section, and the grooves or regions between hardbanding material are 1 mm-5 mm deep and 1 mm-5 mm wide". The angle used herein is not "small" with reference to the horizontal axis. The small angle is not defined specifically in the prior art (such as in U.S. Pat. No. 8,602,113), but a "small angle" is considered in mathematical terms to be an angle where, as an approximation: sin(angle)=angle [in radians], which becomes a poor approximation at angles above approximately 1-2 degrees. This approximation is consistent with the image shown in the prior art found in FIG. 5 and the associated detailed description.

The angle 20 in the current approach is 5 degrees or greater, which allows for abrasive particles to more easily and therefore more quickly pass by the raised hardband 12.

The difference in angle with respect to the horizontal axis between the prior art and the current approach manifests itself in the spacing of the spiral. Differences in spacing resulting from only a few degrees difference in angle result in a substantially different spiral.

The following section is a mathematical representation of the prior art included to illustrate the similarity of a prior art spiral 106 to that of a conventional ring hardband 100.

For a given 120 mm diameter cylinder 102, the Circumference=$\pi$*120 mm=377 mm.

Figure 6:
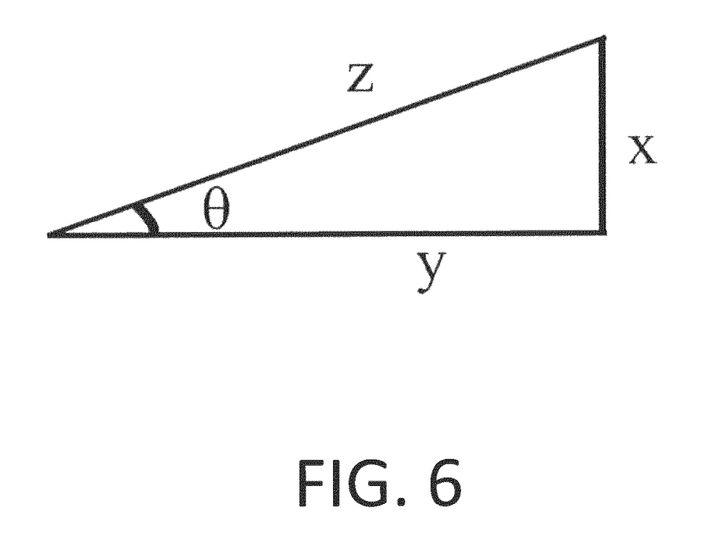
FIG. 6 shows right angle trigonometry.

From right angle trigonometry: $\tan \theta = x/y$, (FIG. 6).

For the case where $\theta$ (120)=1 degree and y=377 mm, x=377 mm*tan 1 degree, x=6.6 mm.

Figure 7:
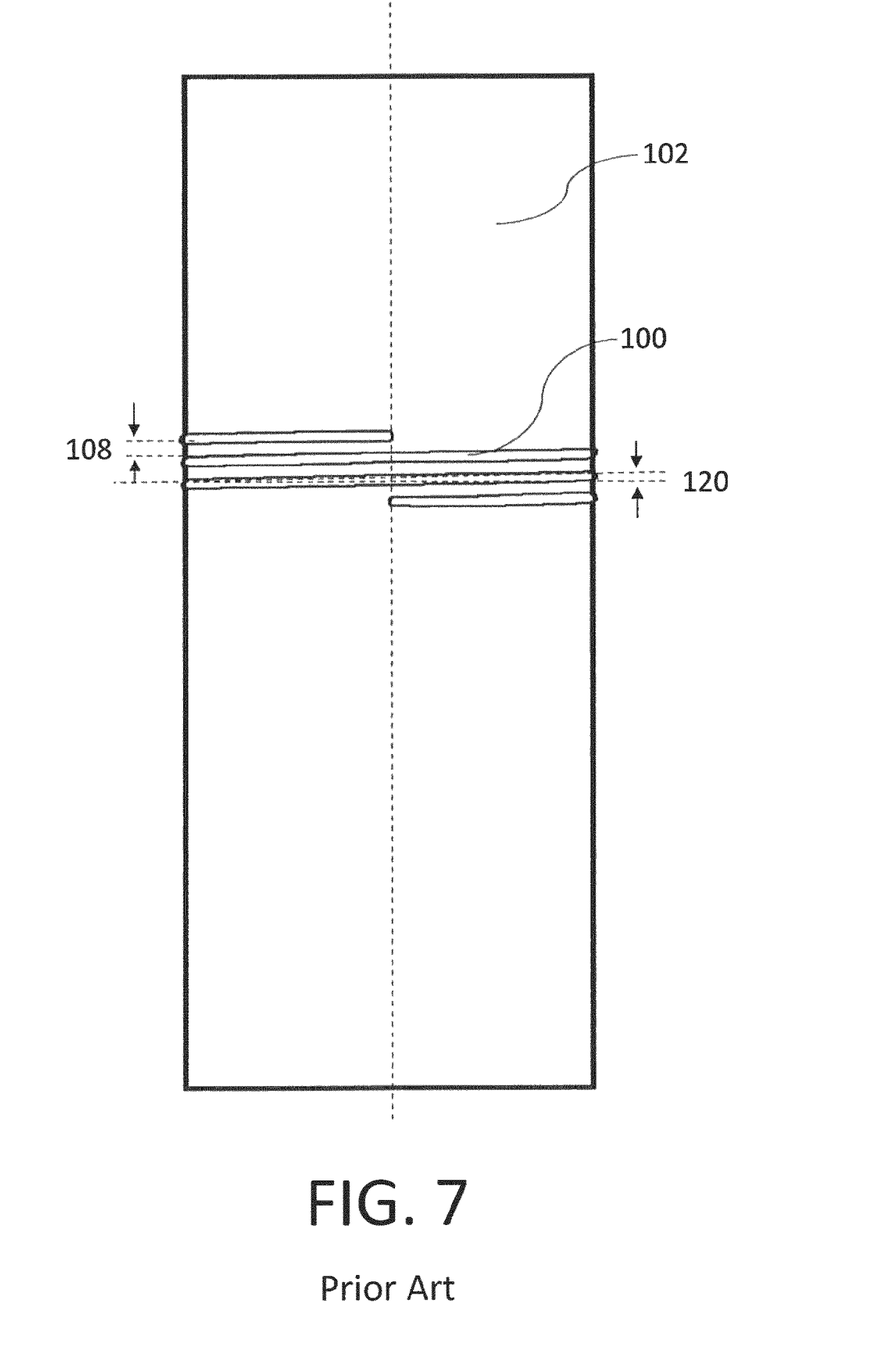
FIG. 7 is a helical hardbanding schematic showing a one degree angle from the horizontal axis with 1 mm width and resulting 5.6 mm spacing inferred by the prior art.
Figure 8:
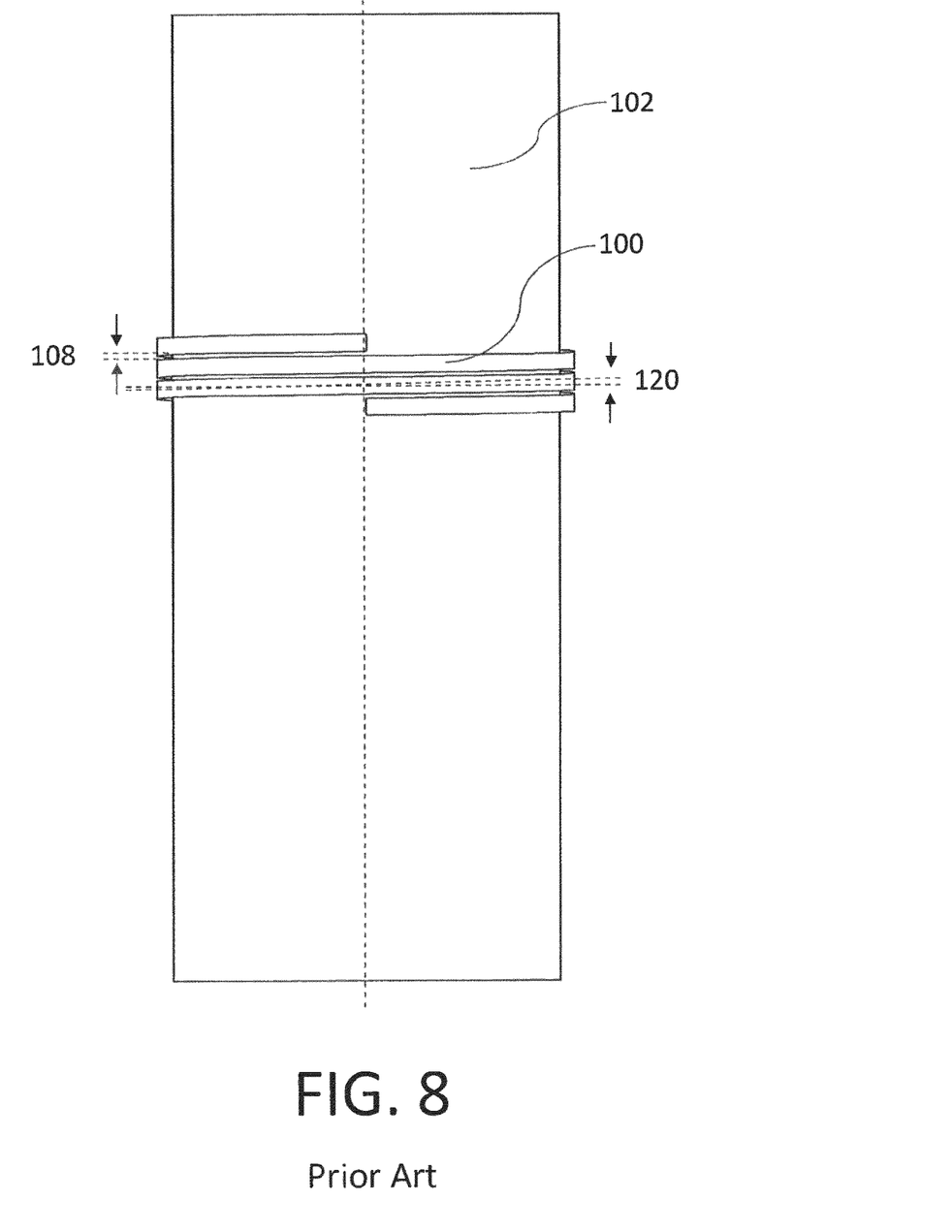
FIG. 8 is a helical hardbanding schematic showing a one degree angle from the horizontal axis with 5 mm width and resulting 1.6 mm spacing inferred by the prior art.

To wrap this triangle around the given 120 mm diameter cylinder 102, with section 'y' parallel to the horizontal axis, the space between the starting point and ending point of line 'z' is represented by the length of line 'x' along the longitudinal axis. For the current example, the length of line 'x' equals 6.6 mm. If the width of the line is taken to be 1 mm, which is the proposed minimum single bead width described in the prior art, the remaining space 108 between the spirals 100 of hardbanding material would be 5.6 mm as shown in FIG. 7. If the width of the band were increased to 5 mm as the proposed maximum in the prior art, the space between the spirals of hardbanding material would be reduced to 1.6 mm as shown in FIG. 8.

Reducing the spacing between spirals would effectively result in it operating as a conventional hardband, as abrasive particles would likely accumulate or pile up in advance of the hardband. The accumulation would occur as the path of least resistance through the space between spirals of hardbanding material has a very small cross sectional area when comparted with the current design.

The length along the longitudinal axis protected by a 1 mm wide helical band with a 1 degree angle relative to the horizontal axis, wrapped around the 120 mm diameter cylinder three times would be 20.8 mm.

For the case where $\theta$ (120)=2 degrees and y=377 mm, x=377 mm*tan 2 degrees, x=13.2 mm.

Figure 9:
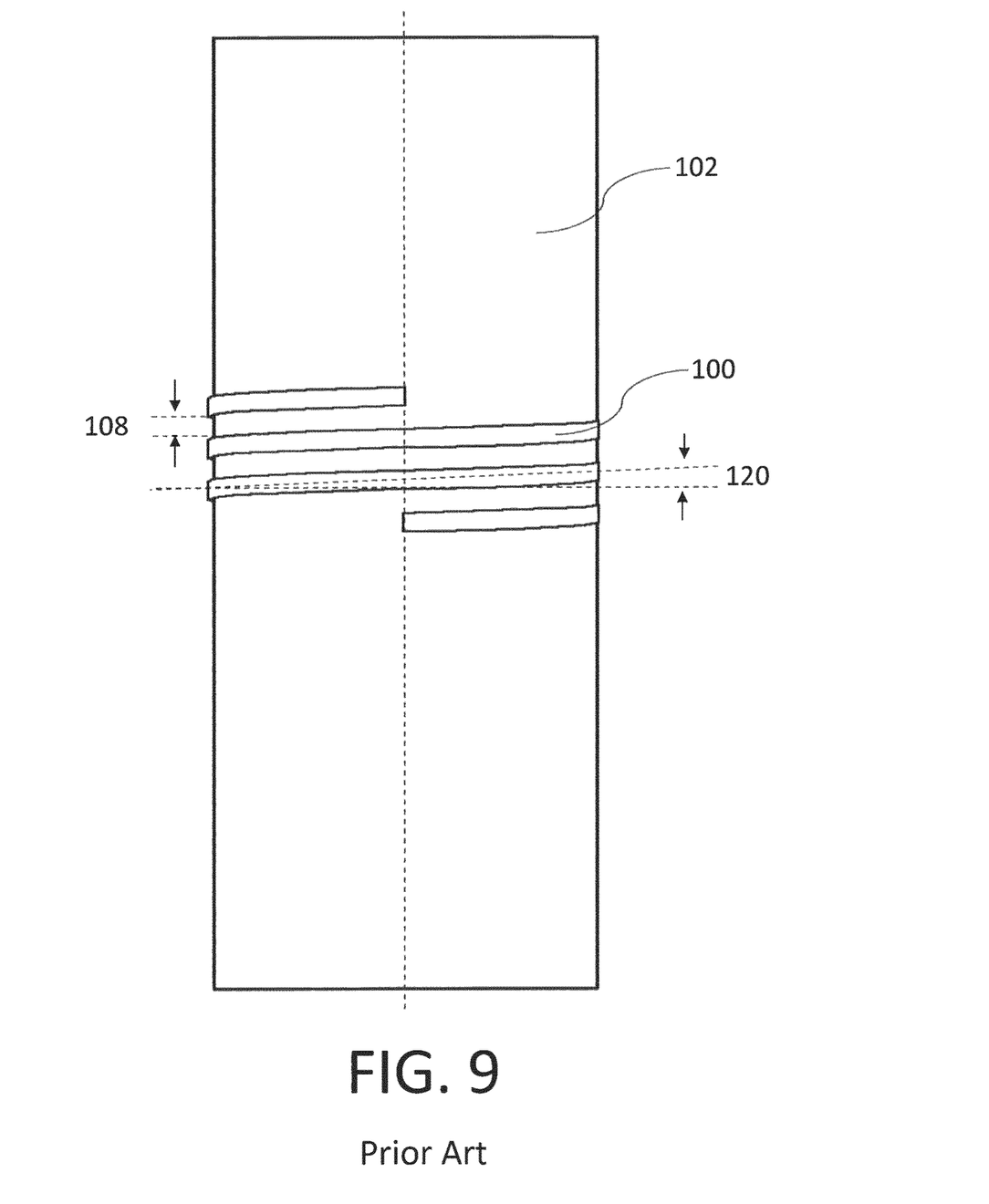
FIG. 9 is a helical hardbanding schematic showing a two degree angle from the horizontal axis with 5 mm width and resulting 8.2 mm spacing inferred by the prior art.
Figure 10:
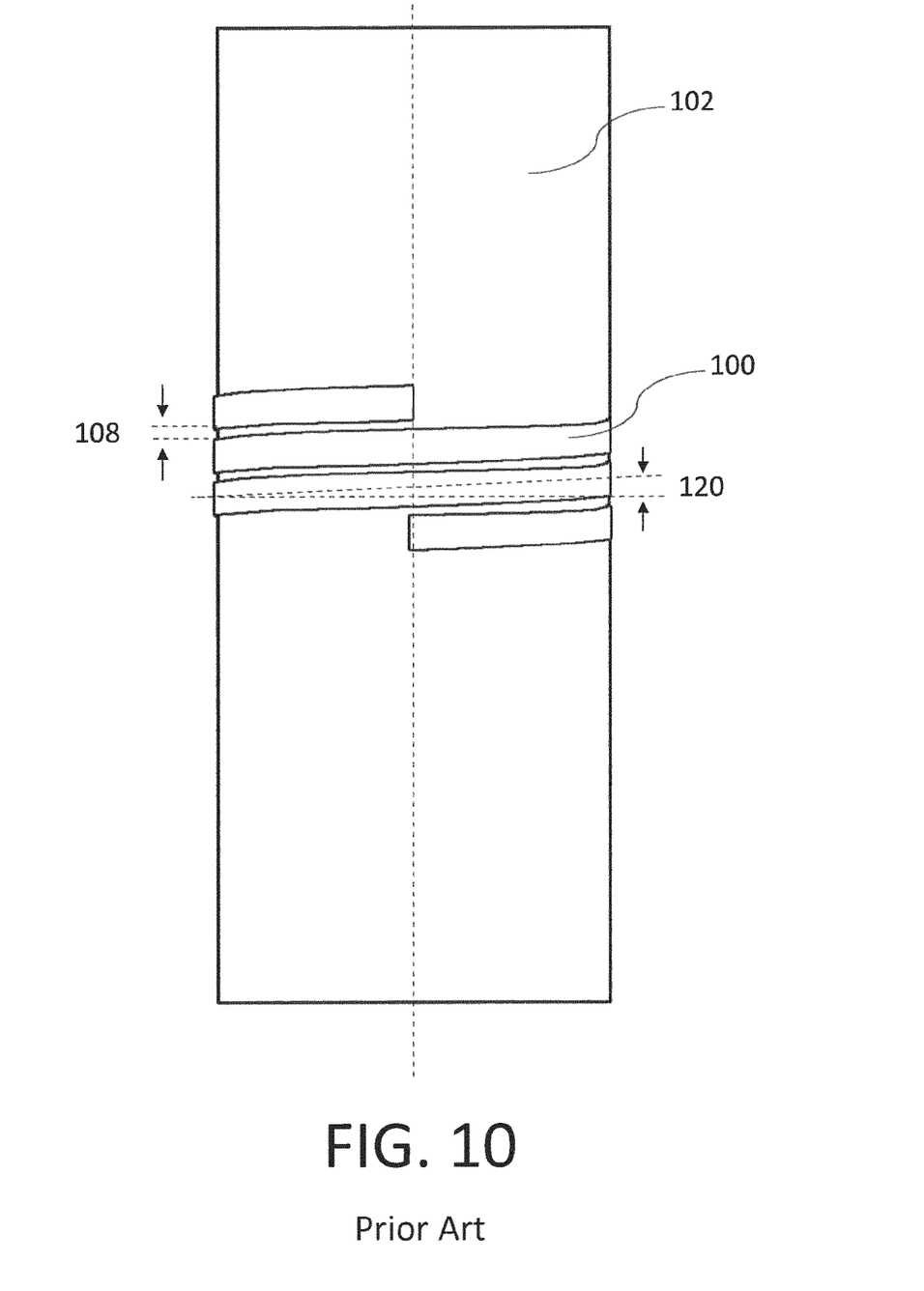
FIG. 10 is a helical hardbanding schematic showing a two degree angle from the horizontal axis with 10 mm width and resulting 3.2 mm spacing inferred by the prior art.

To wrap this triangle around the given 120 mm diameter cylinder 102, with section 'y' parallel to the horizontal axis, the space between the starting point and ending point of line 'z' is represented by the length of line 'x' along the longitudinal axis. For the current example, the length of line 'x' equals 13.2 mm. If the width of the line is taken to be 5 mm, the remaining space 108 between the spirals 100 of hardbanding material would be 8.2 mm, as shown in FIG. 9. If the width was increased to 10 mm, as would be closer to that considered suitable for the abrasive downhole environment, the space 108 between the spirals 102 of hardbanding material would be reduced to 3.2 mm as shown in FIG. 10.

The length along the longitudinal axis protected by a 5 mm wide helical band with a 2 degree angle relative to the horizontal axis, wrapped around the 120 mm diameter cylinder three times would be 44.6 mm.

Increasing the width of a spiral hardband with a 'small angle' of 2 degrees or less to improve its ability to endure the harsh downhole environment has the negative consequence of closing the space between spirals of hardbanding material to a point where only very small particles could pass by. Effectively, many particles that encounter the band would not be able to take the path through the space provided by the spiral either due to their size, or the total volume of particles and the limited cross sectional area of the path of least resistance between the raised spiral hardbanding that relies on transport by hydrodynamic forces. A spiral hardband with a small angle with respect to the horizontal axis of the component could therefore be considered to be not significantly different than a conventional, horizontal ring hardband.

For the case where $\theta$ (20)=5 degrees and y=377 mm, x=377 mm*tan 5 degrees, x=33.0 mm.

Figure 11:
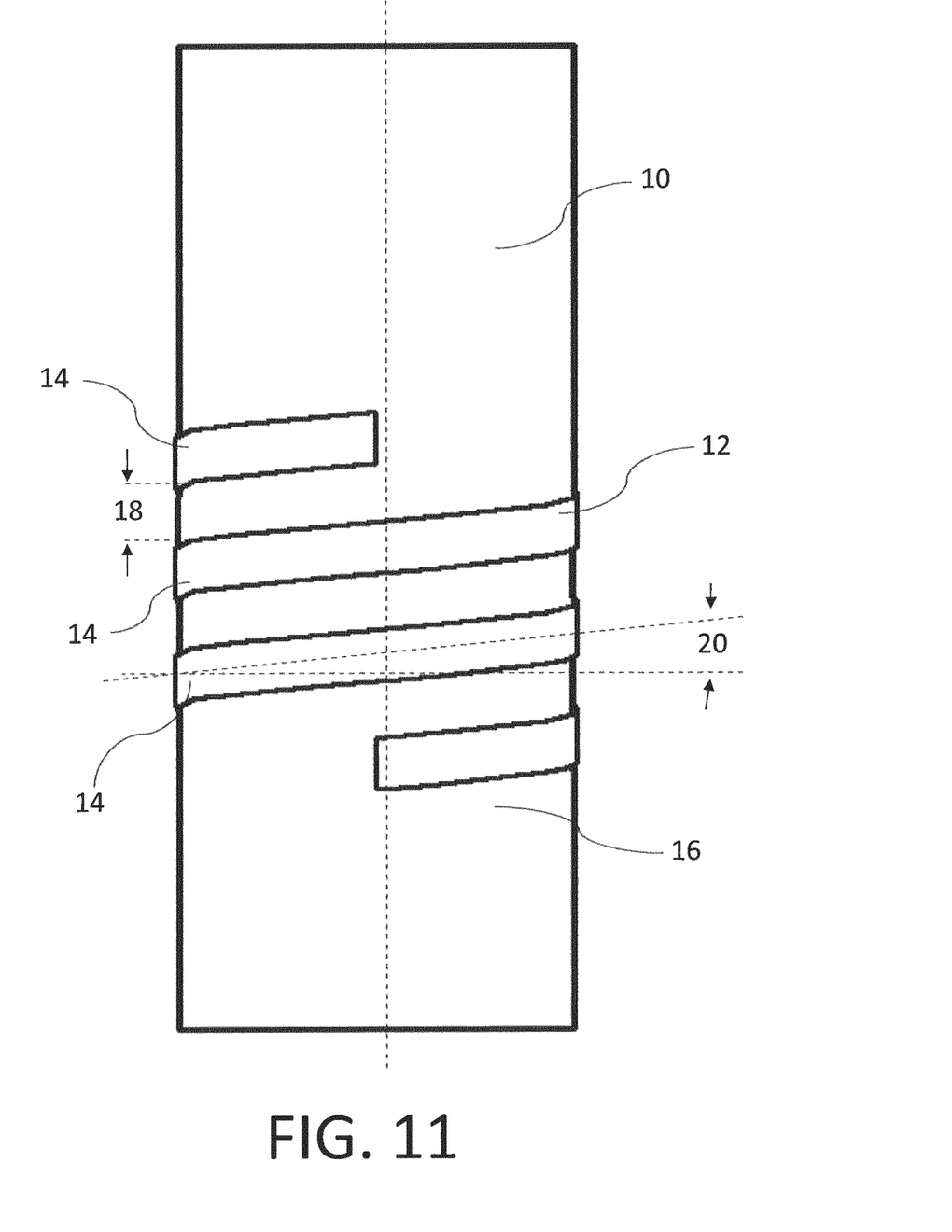
FIG. 11 is a helical hardbanding schematic showing a five degree angle from the horizontal axis with 15 mm width and resulting 18 mm spacing.

To wrap this triangle around the given 120 mm diameter cylinder, with section 'y' parallel to the horizontal axis, the space between the starting point and ending point of line 'z' is represented by the length of line 'x' along the longitudinal axis. For the current example, the length of line 'x' equals 33 mm. If the width of the line is taken to be 15 mm, the remaining space 18 between spirals 14 of hardbanding material would be 18 mm as shown in FIG. 11.

The length along the longitudinal axis protected by a 15 mm wide helical band with a five degree angle relative to the horizontal axis, wrapped around the 120 mm diameter cylinder three times would be 114 mm.

For the case where $\theta$ (20)=10 degrees and y=377 mm, x=377 mm*tan 10 degrees, x=66.5 mm.

Figure 12:
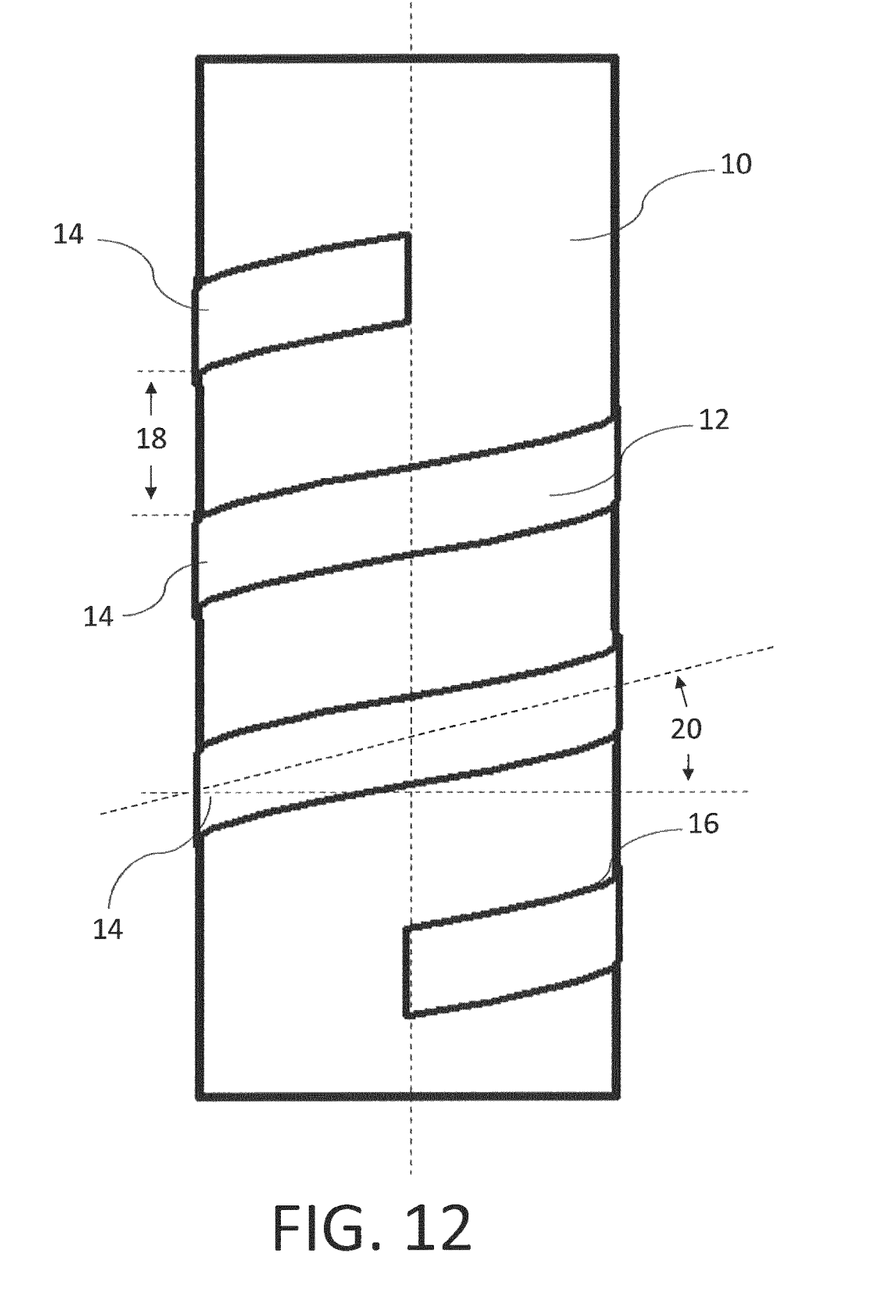
FIG. 12 is a helical hardbanding schematic showing a ten degree angle from the horizontal axis with 25 mm width and resulting 41 mm spacing.

To wrap this triangle around the given 120 mm diameter cylinder, with section 'y' parallel to the horizontal axis, the space between the starting point and ending point of line 'z' is represented by the length of line 'x' along the longitudinal axis. For the current example, the length of line 'x' equals 66.5 mm. If the width of the line is taken to be 25 mm, the remaining space 18 between the spirals 14 of hardbanding material would be 41.5 mm as shown in FIG. 12.

The length along the longitudinal axis protected by a 25 mm wide helical band with a ten degree angle relative to the horizontal axis, wrapped around the 120 mm diameter cylinder three times would be 224.5 mm.

A spiral hardband with an angle of 5 degrees or greater with respect to the horizontal axis allows sufficient space to apply a sufficiently wide hardband to protect from wear and erosion, and allows a relatively large space between that wider hardband for abrasive material to pass the hardband area rapidly. Additionally, the angle of 5 degrees or greater with respect to the horizontal axis provides for greater coverage along with longitudinal axis of the component with fewer wraps around the circumference of that component of a given diameter.

The spacing described in the in the prior art (1-5 mm) is consistent with the above mathematical definition of a small angle.

The spacing of the spiral bands described herein is significantly larger than that of the prior art.

It is likely that for a small angle, the hardband would impacted multiple times by the same abrasive particle similar to the case of a conventional horizontal ring hardband, leading to premature wear as the particle slides against the leading edge of the band. A large angle of 5 degrees or greater would reduce the residence time of that particle along the leading edge of the band with respect to a hardband with a small angle and therefore reduce wear.

The spacing between the spirals on the longitudinal axis is directly related to the angle of the hardbanding with respect to the horizontal axis in that a larger angle will result in larger spacing.

Closely spaced bands described in the prior art (1-5 mm spacing) would only allow relatively small abrasive particles to bypass the area of maximum pressure of contact. Particles larger than the spacing of the bands would likely get stuck in the small space and would either be forced through the area of maximum pressure of contact, or block the path for all other particles to follow. As a result, subsequently arriving particles would either be forced through the area of maximum pressure of contact or would accumulate on the leading edge of the band.

Relatively widely spaced spirals on the hardbands (18 mm spacing or greater between bands) would allow significantly larger particles to pass by the hardband quickly and easily than would be possible based on the geometry described by the prior art.

Widely spaced hardbands allow a larger volume of abrasive particles to pass per unit time when compared with closely spaced hardbands. The increase in volume per unit time is due to the larger effective cross section, or bypass of the 'path of least resistance' resulting from large angle spirals when compared to small angle spirals.

Widely spaced bands would more easily accommodate the flow of abrasive particles in fluids of varying densities and viscosities when compared with narrowly spaced bands that could more easily become clogged, hampering flow.

Widely spaced helical bands of the current design allow helical bands to be interlaced to create a double helix design. The double helix may be employed to provide additional wear protection, primarily where the overall length of the helical hardband may be limited due to geometry of requirements of the tubular component.

Using the hardbanding approach described herein, a single bead spiral of 1-5 mm is not employed, but rather multiple overlapping spiral beads are used together to form a bead that is much wider with more spacing between the spirals than that described by the prior art. A single bead spiral may be employed provided that the width of the single bead is at least 15 mm.

A wide bead (greater than 15 mm) is necessary to protect the major diameter of a drill collar from the environment downhole by providing a larger surface area of hardfacing material on the component.

The residence time of abrasive particles in the vicinity of the spiral band is minimized to reduce associated wear. The wear of the hardband is considered, but also the wear of the base material in the vicinity of the leading edge of the hardband must be considered with respect to the residence time of abrasive particles that will accumulate or pile up there during normal operation.

The prior art shows a relatively thin bead (1-5 mm), with close spacing (1-5 mm gap) that wraps around the part 5 times (as an example). Multiple wraps of the spiral, which would be necessary due to the relatively thin bead and the close spacing, would create a tortuous path for abrasive particles to be carried through the helical hardband by hydrodynamic forces. A more tortuous path means that the mean residence time of a given abrasive particle will be relatively high when compared with a simpler path as shown in the drawings.

The probability of an accumulation or pile-up of abrasive particles in advance of a conventional or helical hardband increases when the mean residence time of an abrasive particle is increased.

An accumulation or pile up of particles in advance of the leading edge of a spiral hardband would result in a similar condition to that of a conventional, horizontal ring hardband.

A pile up of abrasive particles on the leading edge of a hardband is known to cause excessive wear to the base material there, which can undermine the hardbanding 100 by removing the material that it is attached to, as shown in FIG. 2. Hardbanding does not provide effective wear protection of the component if the material supporting that hardbanding is removed.

The current design reduces the residence time of hard particles by promoting the rapid movement of abrasive particles away from the hardband through the use of wide spacing (18 mm or greater), which corresponds to a relatively large helix angle (5 degrees or greater). As used herein, the term "helix angle" refers to the angle between the helix and a line that is perpendicular to the longitudinal axis of the tubular component being hardbanded, and is shown at 20 in FIG. 3.

By limiting the spiral wrapping around the component to 1-3 times rapidly moving abrasive particles are prevented from slowing down to bypass the band area, which provides wear protection to the component. Slowing particles can cause an accumulation of abrasive particles leading to excessive wear.

Hardbands that are 15 mm wide or more are employed to support a greater surface area of the component that is being protected by the hardband when compared to a thin hardband (1-5 mm). The relatively greater surface area of the hardband in the current design protects components during extended use if wear of the leading edge of the band does occur.

The width and spacing of the hardband described above provides protection of the component over a greater length of the along the longitudinal axis of the component due to the elongated nature of the spiral when compared to a helical hardband with a small angle or multiple conventional ring hardbands.

The prior art describes machining grooves into the hardbanding to produce the patterned hardbanding. Laser cladding using 40-80 wt. % tungsten carbide cannot be machined using conventional methods and is typically finished using diamond grinding.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A tubular component, comprising:
   a tubular body having an exterior wear surface and a horizontal axis;
   a single helical band of hardbanding material forming spaced coils around the exterior wear surface of the body, the helical band having a helix angle of 5 degrees or more, the coils having a spacing of 18 mm or more between adjacent coils, and the helical band comprising between 1 and 3 continuous coils around the exterior wear surface.

2. The tubular component of claim 1, wherein the helical band comprises between 2 and 3 continuous coils around the exterior wear surface.

3. The tubular component of claim 1, wherein the hardbanding material is a non-magnetic Ni-based matrix with 40-80 wt. % of spherical fused or macrocrystalline (angular) tungsten carbide.

4. The tubular component of claim 1, wherein the hard band is a minimum of 15 mm wide.

5. A tubular component, comprising:
   a tubular body having an exterior wear surface and a horizontal axis;
   a single helical band of hardbanding material of a non-magnetic Ni-based matrix with 40-80 wt. % of spherical fused or macrocrystalline (angular) tungsten carbide forming spaced coils around the exterior wear surface of the body, the helical band being at an angle of not less than 5 degrees relative to the longitudinal axis of the body, the spacing between the coils being a minimum of 18 mm, and the hard band being a minimum of 15 mm wide, the helical band passing between 1 and 3 times around the tubular component.

6. The tubular component of claim 5, wherein the helical band passes between 2 and 3 times around the tubular component.

* * * * *